(12) United States Patent
Jimenez

(10) Patent No.: US 6,471,625 B1
(45) Date of Patent: Oct. 29, 2002

(54) DAMPING SYSTEM FOR CORRUGATED CARDBOARD FABRICATION ROLLERS

(75) Inventor: Desiderio Garcia Jimenez, Pamplona (ES)

(73) Assignee: Talleras Iruna, S.A., Pamplona (ES)

( * ) Notice: Subject to any disclaimer, the term of this patent is extended or adjusted under 35 U.S.C. 154(b) by 0 days.

(21) Appl. No.: 09/856,057
(22) PCT Filed: Nov. 8, 1999
(86) PCT No.: PCT/ES99/00357
§ 371 (c)(1), (2), (4) Date: May 17, 2001
(87) PCT Pub. No.: WO00/31437
PCT Pub. Date: Jun. 2, 2000

(30) Foreign Application Priority Data

Nov. 23, 1998 (ES) ............................................. 9802450

(51) Int. Cl.⁷ ............................ B25F 5/02; F16C 13/00
(52) U.S. Cl. ........................ 492/6; 492/40; 493/463
(58) Field of Search .......................... 492/16, 60, 7, 492/38, 39, 40, 45, 47, 6; 101/216, 219; 29/895.21, 895.22, 895.23; 493/463

(56) References Cited

U.S. PATENT DOCUMENTS

| | | | | |
|---|---|---|---|---|
| 905,111 A | * | 11/1908 | Stehling et al. | 492/42 |
| 1,271,194 A | * | 7/1918 | Meyer | 492/42 |
| 1,883,183 A | * | 10/1932 | Weber | 492/47 |
| 1,883,185 A | * | 10/1932 | Weber | 492/47 |
| 2,114,378 A | * | 4/1938 | Gundlach | 492/40 |
| 2,803,126 A | * | 8/1957 | Meyer | 492/40 |
| 3,075,406 A | | 1/1963 | Butler, Jr. et al. | |
| 3,094,771 A | * | 6/1963 | Robertson | 492/7 |
| 3,389,450 A | * | 6/1968 | Robertson | 492/7 |
| 3,604,087 A | * | 9/1971 | Beck | 492/42 |
| 3,653,108 A | * | 4/1972 | Maca et al. | 492/16 |
| 3,848,304 A | * | 11/1974 | Lucas | 492/7 |
| 4,313,577 A | | 2/1982 | Peters | |
| 4,604,778 A | * | 8/1986 | Edwards | 492/47 |
| 5,235,909 A | | 8/1993 | Gerstenberger et al. | |
| 5,483,811 A | * | 1/1996 | Miller | 492/39 |
| 5,595,117 A | | 1/1997 | Chrigui | |
| 5,848,958 A | * | 12/1998 | Damkjaer | 492/39 |

FOREIGN PATENT DOCUMENTS

DE 36 32 418 3/1988
EP 0 044 612 1/1982

* cited by examiner

Primary Examiner—S. Thomas Hughes
Assistant Examiner—Marc Jimenez
(74) Attorney, Agent, or Firm—Nath & Associates PLLC; Gary M. Nath; Harold L. Novick

(57) ABSTRACT

Damping system for corrugated cardboard fabrication rollers comprising the incorporation of a damping device in the vapour chamber (2) of the application roller (1), said device being mounted integral with respect to the wall of the corresponding roller (1) so that the vibrations affecting the roller (1) are transmitted to the device, the vibration of the incorporating device being opposed to the vibration of the roller (1) as a result of the action-reaction principle thereby damping the vibration of the roller (1).

3 Claims, 4 Drawing Sheets

DAMPING SYSTEM FOR CORRUGATED CARDBOARD FABRICATION ROLLERS

In the production of corrugated cardboard two corrugated rollers are used, in charge of making the corrugated conformation of the intermediate paper or core of the cardboard, and a flat roller, in charge of fixing another paper, which determines one of the flat faces of the cardboard, on the corrugated one. The paper building up the other flat face of the cardboard is glued on later in another part of the installation.

The following factors intervene in the corrugation of the intermediate paper and the gluing of the flat paper on it.

Pressure: the rollers exercise a pressure of between 3 and 4 $kg/mm^2$ for the corrugation and a pressure of between 2 and 3 $kg/mm^2$ for the gluing.

Temperature: being it required that the paper reaches a temperature of about 180° C. for which the rollers are warmed by introducing saturate vapour in its interior.

Humidity: the paper should have certain humidity, for the corrugation formation and the gluing to be correct.

Therefore, in the mentioned production of corrugated cardboard two corrugated rollers and a flat one are made to rotate, exercising high pressure between them, which causes that the corrugating device and the mentioned rollers support a high vibration level while in operation, mainly the flat roller, as it has to rotate against a notched roller.

The mentioned vibrations have two fundamental features to be kept in mind:

Vibration frequency: which depends on the notch pitch and the rotation speed of the rollers.

Vibration level: which is determined by very diverse factors, such as for example the structure of the machine, foundations, inertia and elasticity of the rollers, the profile type of the notch, the state of the rollers, the thickness of the used sheets of paper, the corrugating and gluing forces, as well as the production speed, or which is the same as the vibration frequency.

In a corrugating device with certain rollers, the only variable to change the vibration frequency is the rotation speed of the rollers, but this is defined by the type and quantity of orders, so that actuating on this variable is very restricted, or even null.

On the other hand, it is the vibration level which most affects the problems and it can happen during the production of corrugated cardboard, as when this level is excessively high, too strong marks appear and even cuttings in the produced cardboard.

Among the factors which affect the vibration level there is the design of the corrugating device, so that depending on this corrugating design there are some with more or less propensity to have vibration problems. Another factor in this respect is the vibration frequency, which in principle can be any and therefore can coincide with some of the resonance frequencies (or natural frequencies) of some part of the corrugating device, as for example the rollers; so that when the corrugating device is especially problematic, low weight sheets are used, i.e. they provide little damping, the notch pitch profile is high and at great height, if moreover the resonance frequencies of the rollers are reached, the possibilities of the cardboard to be faulty are very high at certain speeds.

To solve the problem solutions have been attempted, such as reducing the corrugation and gluing forces to the maximum so as to reduce in consequence the vibration level and the mark of the cardboard but this solution brings about other inconveniences, such as the lack of forces at other speeds different from the resonance one (especially at high speeds), as well as the unstableness of the corrugating device, which is seen in the paper connections.

Another purpose to solve the problem is by trying to move away the first natural frequency from the frequency ranges of the operation vibration, but nevertheless the geometric and material limitations of the roller design make that the frequency deviation possibility is not enough, always having it inside the working ranges.

The first natural frequency of the rollers is the only one that is reached in the corrugating devices, since when the vibration frequency is double the first frequency, it also excites the roller to the first natural frequency. The first vibration mode represents the form that the roller acquires when this gets excited at the first natural frequency, being this form similar to that of roller deformation, when it flexes by a load applied in the center, i.e. that the deformation is maximum in the center and it falls progressively towards the ends. From this it can be seen that the problems of an excess mark and cardboard cutting in the first natural frequency appears in the central area of the rollers with tendency to disappear towards the end.

According to the present invention a one solution is proposed to the mentioned vibration problem with the corrugating devices for the production of corrugated cardboard, based on a damping system applied to the rollers of the mentioned corrugating devices, by means of which the vibration energy is absorbed reducing this way its level.

This system object of the invention consists in including inside the rollers a damping device in solidary assembly respect to the wall of the corresponding roller, so that when vibrations take place inside the roller, the interior device also vibrates being opposed its vibration to that from the activation source, which is the roller, so that the vibrations of this are damped, disappearing the negative causes of the same on the paper to produce the corrugated cardboard.

The damping effect takes place especially at critical speeds, which is when the roller resonance is reached; being foreseen a realization of the device that acts particular at these speeds, while another realization damps the vibrations at all the critical speeds, optimizing the damping at these speeds.

The assembly of the device respect to the roller wall is established by means of a flexible jacket and with interference adjustment, so that the dilation differences because of the temperature are absorbed without affecting the roller outside.

The adjustment areas between the damping device and the roller wall are moreover established with holes which allow the vapour and condensate passage from one side to the other, while centrally through the damping device itself a conduit is defined which allows the vapour passage from the entrance tube, with which the roller heating does not suffer damage because of the damping device incorporation.

The preconized system provides an advantageous practical solution against the vibration problem of the mentioned rollers to produce corrugated cardboard, fulfilling with the following particularities:

The damping device can be designed easily to work at the heating temperature of the application rollers and in the atmosphere of saturated vapour corresponding to this heating, without deformation or corrosion damage.

In its installation the damping device does not affect the heat transfer inside the corresponding rollers, so that the heating of these does not suffer alteration.

The evolution of the behaviour of the damping device in time is not significant during the useful life of the roller, resulting in no maintenance.

The temperature differences that can be obtained, to avoid that the dilations of some areas regarding the others produce deformations in the rollers, do not affect the operation.

The damping device is installed in the vapour chamber determined inside the rollers, and its incorporation supposes no nuisance whatsoever to the conformation process of the corrugated cardboard, so that no change in the installation is necessary.

The object of the invention refers to a damping system to compensate the vibrations of the rollers to produce corrugated cardboard, with the purpose of eliminating the defects that the mentioned vibrations cause in the produced cardboard.

The system consists in including inside the hollow body (1) of the rollers a device that vibrates activated by the vibration that the roller acquires during the operation, so that the mentioner vibration of the incorporated device is opposed to the vibration characteristic of the roller (1), being therefore damped.

Figure 1:
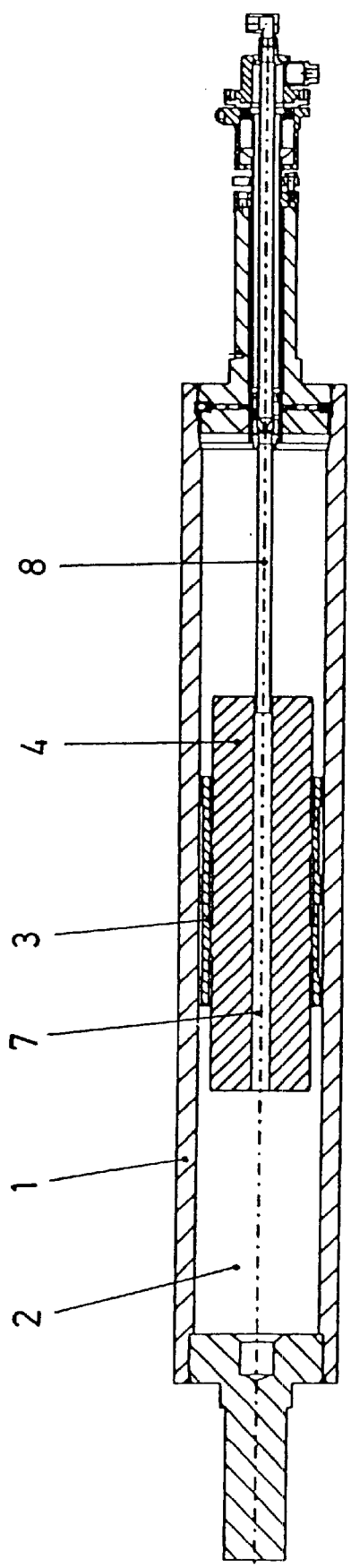
FIG. 1 represents a way to carry out the preconized system, in connection with an application roller.
Figure 3:
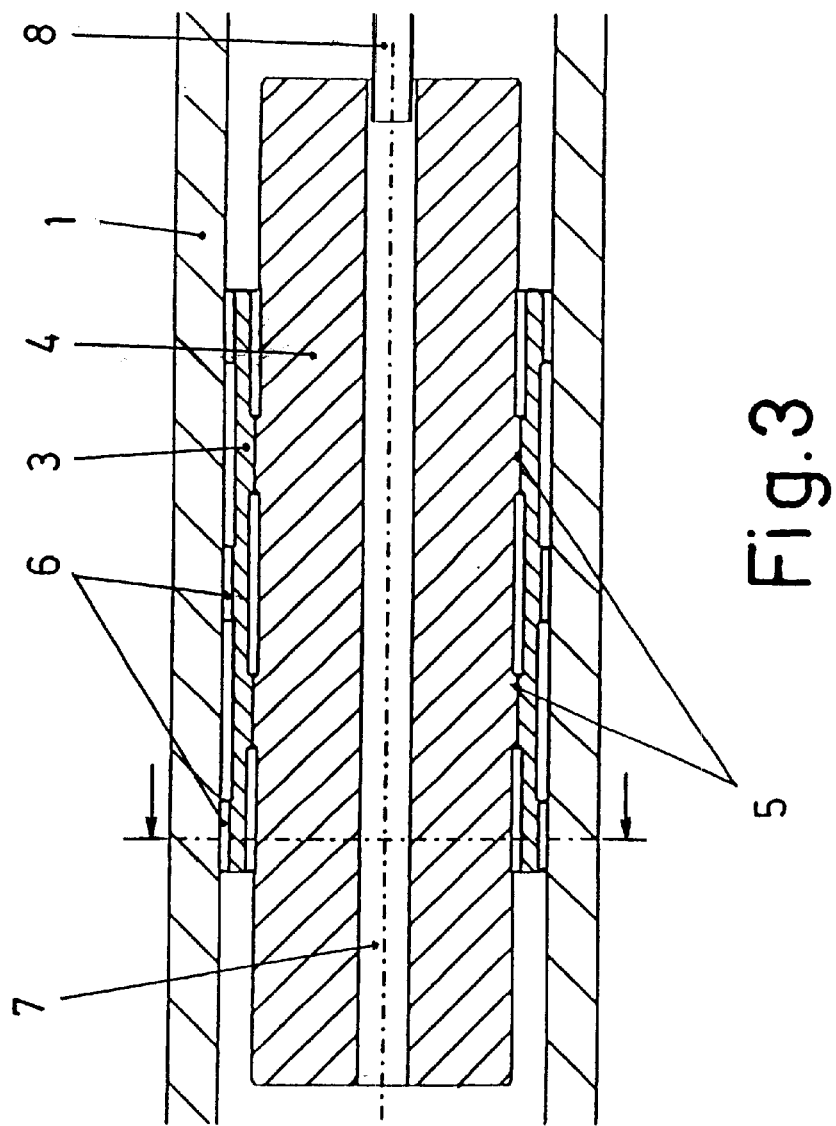
FIG. 3 is a corresponding enlarges detail in longitudinal section of the formation and assembly of the damping device according to the same previous realization.
Figure 2:
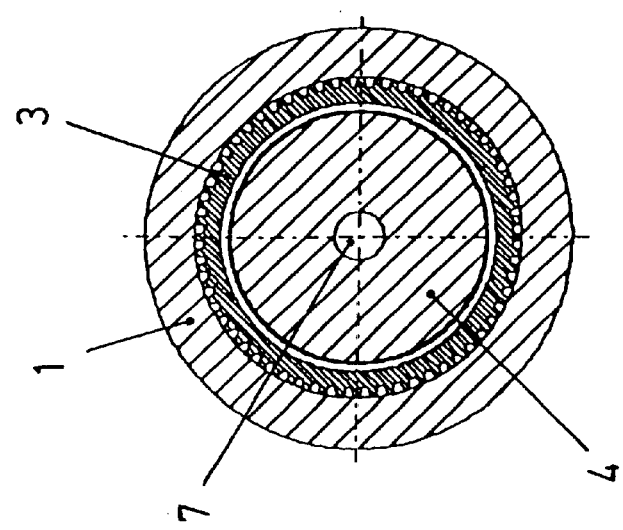
FIG. 2 is an enlarged detail in the traverse section of the disposition of the corresponding damping device according to the realization of the system indicated in the previous figure.

The damping device is included in the vapour chamber (2) defined by the rollers (1) inside for the introduction of the heating vapour; being formed the mentioned damping device, according to a realization (FIGS. 1 to 3) by a device whose first natural frequency coincides with the first natural frequency of the roller (1) with the mentioned device mounted so that when the first natural frequency of the roller (1) is reached, this enters in resonance, the same as the damping device, reacting this against its excitement source, which is the roller (1) itself.

The device is formed according to this realization by a jacket (3) and a core (4), which are mounted with interference adjustment between them, by means of contact supports (5) which establish a solidary union between the mentioned parts (3) and (4).

The device set is mounted in turn with interference adjustment on the roller body interior (1) by means of respective contact supports (6), remainig this way the mentioned device fixedly fastened in connection with the indicated body (1) of the corresponding roller.

To avoid heat transfer problems in the adjustment areas, the supports (6) between the jacket (3) of the damping device and the body (1) of the roller, toothings are foreseen with which the vapour and the condensate can pass through the holes left by the teeth, without harming the heating.

The temperature that the damping device acquires is logically bigger than that of the roller (1), so that the expansions of the first will be bigger than those of the second, which can give rise to deformations at the roller (1) outer part, affecting the production, getting faulty corrugated cardboard. To avoid this problem, the supports (5) between the jacket (3) and the core (4) of the damping device and the supports (6) between the mentioned jacket (3) and the roller body (1) are foreseen unfaced, so that the flexibility of the jacket (3) absorbs the expansion differences without these being transmitted to the roller body (1).

On the other hand, the core geometry (4) and its assembly supports (6) are such that the first natural frequency to flexion of the same coincides with that of the roller (1) provided with the damping device, so that the resonance of the mentioned core (4) also enters in the roller (1) resonance, being opposed its vibration to that of the roller (1) by the principle of action and reaction.

The core (4) moreover defines an axial hole (7), through which the vapour passage from the corresponding entrance tube (8) is possible till the other side of the vapour chamber (2); so that the vapour, together with the condensate that is former pass to the front side of the chamber (2) through the holes between the support teeth (6) between the jacket (3) and the roller body (1).

Figure 4:
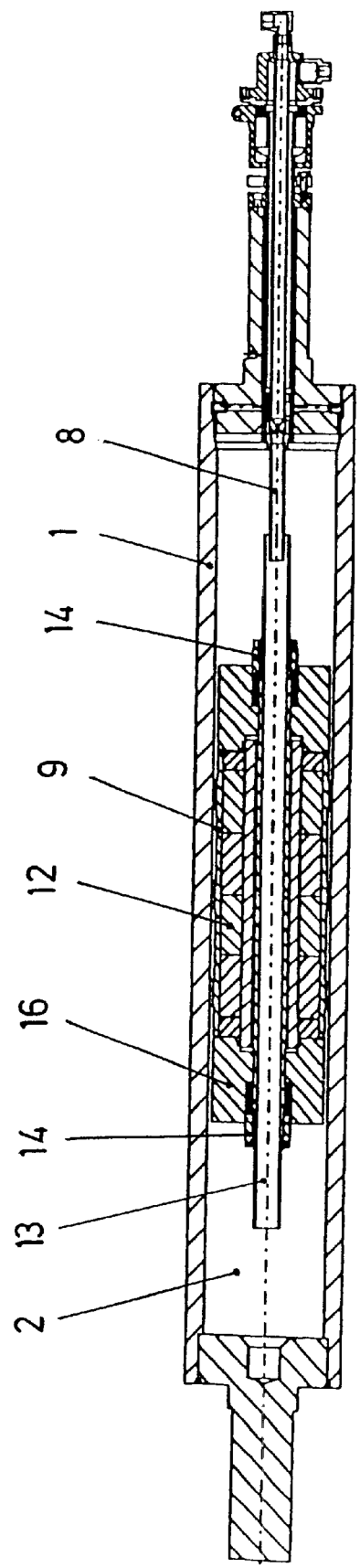
FIG. 4 shows another realization of the system, in connection with a respective application roller.
Figure 5:
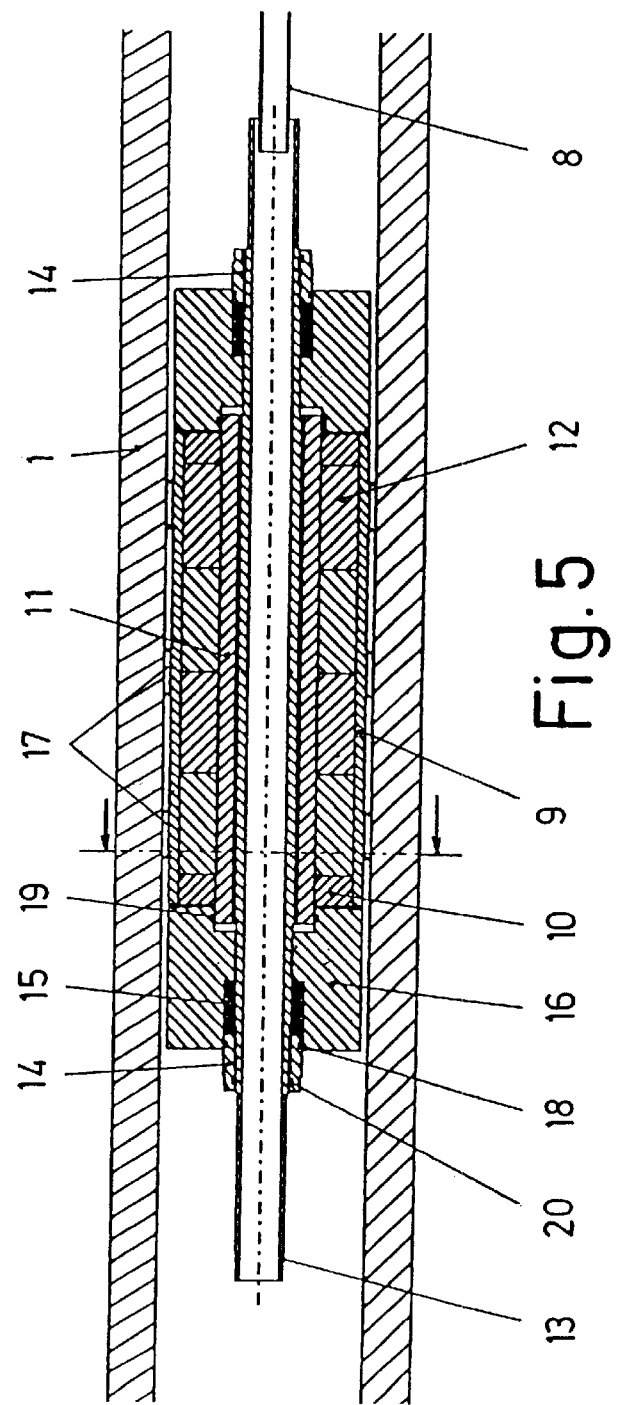
FIG. 5 is an enlarged detail in longitudinal section of the formation and assembly of the damping device according to the mentioned second realization form.
Figure 6:
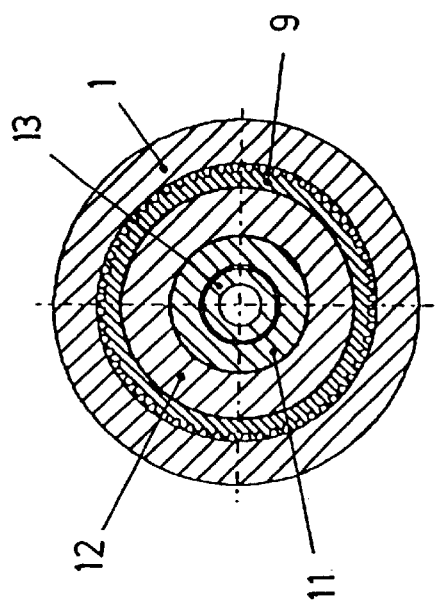
FIG. 6 is an enlarged detail in transversal section of the disposition of the damping device according to that realization form of the previous figure.

According to another realization (FIGS. 4 to 6), the damping device is formed by a device that acts at all the speeds, included the critical one, absorbing the vibration energy, although the action is more intense at critical speeds so that the application will be directed to optimizing the damping at those speeds.

In this realization the device includes jacket (9), at the ends of which some rings (10) are mounted at the inside with interference adjustment, regarding which another jacket (11) is in turn incorporated, at the inside, also with interference adjustment.

Inside that set some damping bushings are included (12),which are established with an intermediate play that is stuffed with grease, by means of which the surfaces are protected against corrosion, at the same time that their viscosity favours the damping of the sliding friction between the bushings (12). The mentioned play between the bushings (12) can selectively be varied, to get an optimum damping at the critical speed of each case.

A tubular shaft (13) which crosses axially the set is installed, on which some nuts are mounted (14) which press the respective elastic washers (15), which in turn press some corresponding friction masses (16) that friction against the installed set of damping bushings (12).

The pressure of the elastic washers (15) is also adjustable to obtain a maximum damping in each case; allowing the tubular shaft (13) the vapour passage from the respective entrance tube (8); while the fixing of the set respect to the corresponding roller body (1) is established in this case with interference adjustment, by means of contact supports (17) between the jacket (9) and the roller body (1) in such a way that the expansion differences because of the temperature are absorbed by the elasticity of the jacket (9) itself without affecting the roller body (1). The supports (17) are in this case also established toothed, allowing this way the condensate and vapour passage between both parts of the respective vapour chamber (2) separated by the incorporation of the device.

The friction surfaces of the friction masses (16) are charged again in the production with a brass lining, to avoid the seizing and to assure an appropriate duration of the mentioned surfaces; while the holes between the nuts (14), the friction masses (16), the shaft (13) and the inner jacket (11), are also stuffed with grease to protect the contact surfaces, including between the nuts (14) and the friction masses (16) an O-ring (18), between the friction masses (16) and the interior jacket (11) another O-ring (19), and between the nuts (14) and the shaft (13) another O-ring (20), by means of which appropriate closures are established which avoid the escape of the grease out of the mentioned holes.

What is claimed is:

1. A damping system for corrugated cardboad fabrication rollers, which has a damping device included inside a roller to counteract vibrations of the roller, wherein said damping device is fixedly mounted to a wall of said roller and comprises:

two spaced-apart coaxial jackets which define a space therebetween, each jacket having two ends, and a closing ring located at each of the corresponding ends of said jackets;

damping bushings loosely situated in said space and grease located in said space between said damping bushings;

a tubular axis extending axially through said damping device;

friction masses incorporated on said tubular axis;

elastic washers pressing said friction masses; and corresponding nuts to said elastic washers which allow regulation of tightness so as to adjust damping.

2. A damping system for corrugated cardboard fabrication rollers, according to claim 1, wherein said roller has a hollow body; and wherein said damping device is fastened to said roller body by interference adjustment support contacts so that elasticity of one of the coaxial jackets compensates for expansion differences caused by temperature between the damping device and the roller body, thereby preventing said expansion differences from causing a deformation of the roller body.

3. A damping system for corrugated cardboard fabrication rollers, according to claim 2, wherein said support contacts which fasten the damping device to the roller body comprise toothed rings having teeth which define hollows therebetween, said hollows allowing passage of condensate and vapour from one side of said damping device to another side of said damping device in a chamber of the roller body.

* * * * *